3 Sheets—Sheet 1.

H. RUPPEL.

STOVE FOR BURNING HYDROCARBON OIL AND ITS VAPORS.

No. 11,608. Reissued June 15, 1897.

Witnesses
Jas. H. Blackwood
A. B. Blackwood.

Inventor
Henry Ruppel
H. T. Fisher
Attorney

3 Sheets—Sheet 2.

H. RUPPEL.

STOVE FOR BURNING HYDROCARBON OIL AND ITS VAPORS.

No. 11,608. Reissued June 15, 1897.

ATTEST
H. C. Mudral

INVENTOR.
Henry Ruppel

By H. T. Fisher ATTY

3 Sheets—Sheet 3.

H. RUPPEL.

STOVE FOR BURNING HYDROCARBON OIL AND ITS VAPORS.

No. 11,608. Reissued June 15, 1897.

Attest
T. B. Moser
H. E. Mudra

Inventor.
Henry Ruppel
By H. T. Fisher Atty

UNITED STATES PATENT OFFICE.

HENRY RUPPEL, OF CLEVELAND, OHIO, ASSIGNOR TO THE DANGLER STOVE AND MANUFACTURING COMPANY, OF SAME PLACE.

STOVE FOR BURNING HYDROCARBON OIL AND ITS VAPORS.

SPECIFICATION forming part of Reissued Letters Patent No. 11,608, dated June 15, 1897.

Original No. 471,399, dated March 22, 1892. Application for reissue filed May 20, 1897. Serial No. 637,446.

*To all whom it may concern:*

Be it known that I, HENRY RUPPEL, a citizen of the United States, residing at Cleveland, in the county of Cuyahoga and State of Ohio, have invented a certain new and Improved Stove for Burning Hydrocarbon Oil and its Vapors, of which the following is a full and complete description.

My invention relates to burners whereby hydrocarbon vapor or gas is generated without the aid of a sublight.

Figure 1:
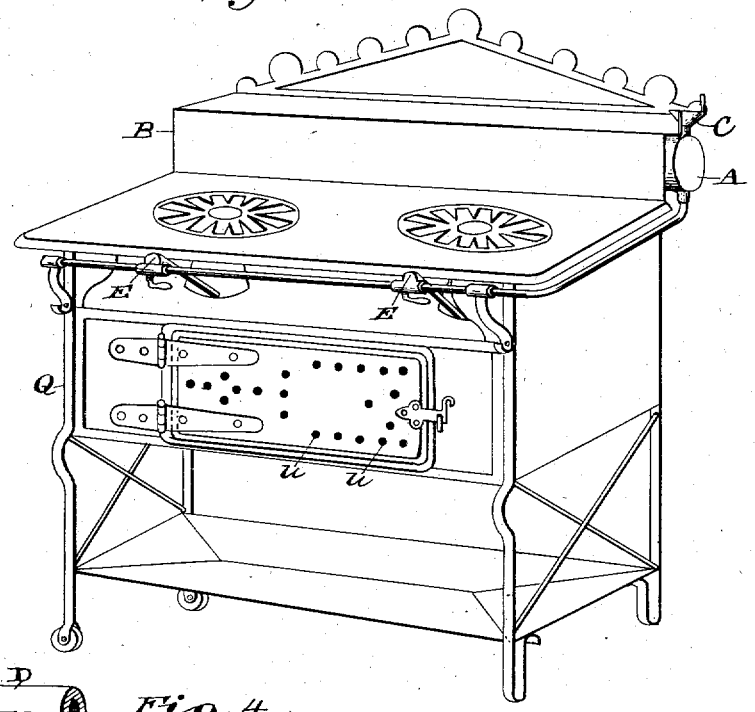
Figure 4:
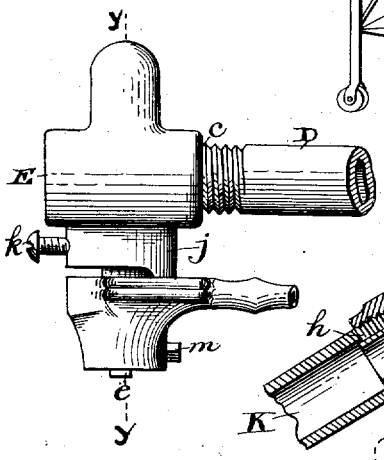
Figure 5:
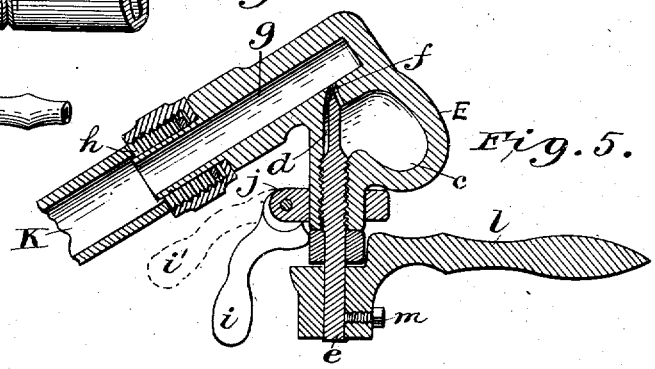
Figure 2:
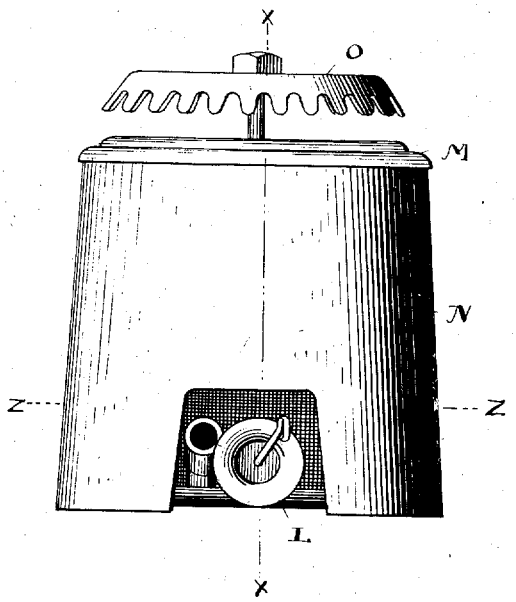
Figure 3:
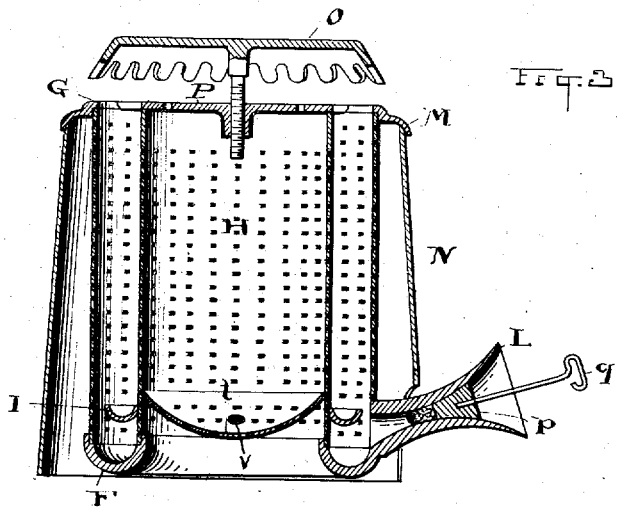
Figure 6:
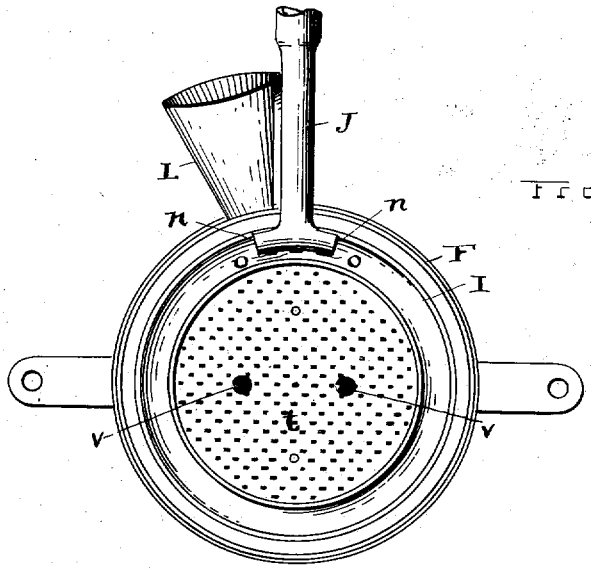
Figure 7:
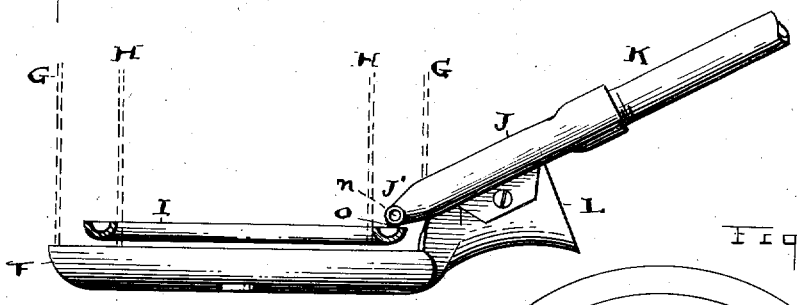
Figure 8:
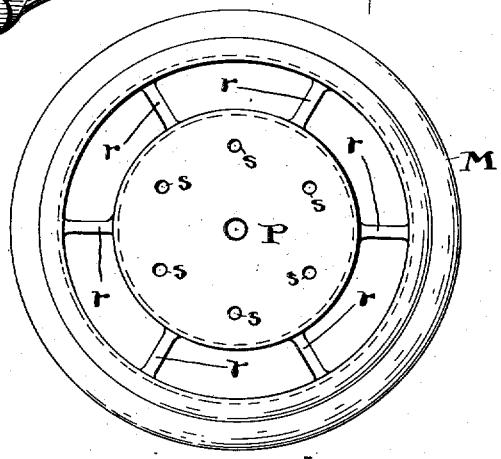

Figure 1 is a perspective elevation of a complete stove embodying my invention. Fig. 2 is a side elevation of one of the burners detached from the stove. Fig. 3 is a central sectional elevation of a burner alone on line *x x*, Fig. 2. Fig. 4 is a side elevation of one of the valves detached; and Fig. 5 is a central vertical sectional elevation thereof on line *y y*, Fig. 4. Fig. 6 is a plan view of one of the burners, looking down from a line corresponding substantially to *z z*, Fig. 2, but omitting the outer casing and showing particularly the perforated disk in the inner tube near its lower end. Fig. 7 is a side elevation of the primary and secondary oil and vapor troughs, the T-nozzle for supplying the oil, and the lighting-tube, as hereinafter fully described. Fig. 8 is a plan view of a detached burner-cap corresponding in scale to Fig. 6 and showing especially the construction of the perforated disk at the top of the inner tube and the support therefor.

A represents the fluid-tank, located at the back of the stove on a shelf (not shown) and provided with a filling-funnel C and a pipe D to supply fluid to the burners.

Referring now to Figs. 4 and 5 especially, I show a valve mechanism which is connected with supply-pipe D and is adapted to control the flow of fluid to a burner, each burner having its own valve mechanism, as seen in Fig. 1. This valve mechanism comprises the valve-casing E, constructed to be threaded into the supply-pipe D at *c* and having an interior chamber *d* in open or free communication with said pipe. A needle-valve *e* and a valve-orifice *f* determine the flow of fluid from chamber *d* to the fluid-duct *g*, which leads to the burner feed-pipe K, a packing *h* securing the joint between duct *g* and pipe K.

The sleeve J is rotarily adjustable on the stem of valve-casing E and held in any desired place by a set-screw *k*. The sleeve *j* may be so adjusted by means of this screw *k* that the gravity-stop *i* will permit the opening of the needle-valve just the right distance for the proper supply of oil for the ordinary flame. By raising stop *i* to the position shown in dotted lines the valve *e* can be opened to its full capacity, and consequently increase the flame and intensify the heat. The lever *l* is rigidly attached to the needle-valve *e* by a set-screw *m*, or any suitable means of attachment is designed to operate said valve. The stop *i* is so located on the sleeve *j* that when down in its normal position it will arrest the movements of said handle, but adapted to be moved or raised out of the path thereof when a further rotation of the handle is desired.

The burners each consist of a circular primary trough F, two perforated chimneys G and H, and a secondary trough I above the primary trough. This secondary trough is located a sufficient distance above the primary trough to allow perforations in the chimneys between the two troughs, and is shown as closely encircling the inner perforated tube and smaller than trough F, so that it leaves an open passage or space between it and the outer tube G to allow the vapors to rise from the primary trough F.

The oil flows into trough I from feed-pipe and T-nozzle J, the latter having open ends *n* and a series of perforations *o* along its bottom through which the oil enters trough I. As this occurs at the starting of the burner and more or less vapor is generated by exposure of the oil in trough I, said vapor naturally settles down into the lower trough F, where it is lighted through flaring tube L, a stopper *p*, having a handle *q*, serving to close this tube. A coating of asbestos or the like is preferably applied to the inner portion of stopper *p*. Then as the vapors in trough F are ignited they heat the secondary trough I, which promotes vaporization of the oil in the chamber formed between the walls of the two chimneys G and H, and particularly in trough I, as is obvious. Trough F serves also to catch any overflow from trough I.

M is a cap which surmounts the outer perforated chimney-tube G and the casing N about said tube and closes the air-space between said casing and tube.

A disk P, Fig. 8, covers the interior of the inner perforated chimney-tube H, and is shown with six different perforations for the passage of air from beneath. This disk is supported by slight arms or webs *r* from the cap M and which extend across the top of the combining-chamber between the chimneys or tubes G and H. The perforations *s* are relatively small, so as to sustain only a small flame, and are arranged in a circle some little distance from the edge of the disk, and hence do not interfere with the mixing operation which goes on above said disk, as herein described.

A scalloped deflector O is attached at its center to the center of disk P by a threaded stem extending some distance through said disk, whereby said deflector can be adjusted up and down or wholly removed. The gas rising from the combining-chamber flows over the disk P and said deflector about the scalloped edge thereof, as will appear more clearly in the description of the operation of the burner.

In the lower part of the inner perforated chimney-tube H is arranged a perforated, preferably concavo-convex, device which spans the said tube, and by reason of its location a slight distance above the lower perforations in said tube, as well as slightly above the point of vaporization, not only retards the upward flow of air but deflects a sufficient quantity of air into the combining-chamber at that low area to serve the needs of the burner at that point.

The plate *t* is uniformly perforated for the passage of air and is bent into concavo-convex form before being inserted into the tube H, and this gives it a fixed or rigid construction. Hence in the expansion of tube H by heating the said device would drop down if not specially supported, and for the purposes of such support I show two holes *v*, through which fastening-bolts (not shown) can be inserted.

Obviously the aggregate area of scattered perforations *s* in disk P is considerably less than the aggregate area of the perforations in plate *t*, and the area of the perforations *s* being sufficient to supply the demands of the burner for air from within at its top the detained air beneath said disk which passes plate *t* is checked back, so as to flow through the perforations of the inner tube and supply the needs of the combining-chamber between said disk P and the plate *t* below.

The deflector O, being constructed and arranged as shown, serves to prevent overflow from vessels on the stove from falling into the interior of the burner.

Now having a burner constructed substantially as shown and described, the operation is as follows: In the chamber between the two perforated tubes G and H only small globules of blue flame are observed over each of the thickly-scattered perforations in said tubes, the size of the globule or flame depending on the size of the opening and the amount of air admitted. The globules below the plate *t* are visibly larger than those above, and those just above said plate for some distance are smaller than higher up; but all the perforations in said tubes are uniform and comparatively fine, so that a relatively small volume of air enters each one at most. The aggregate effect of these numerously-dotted flames is to convert the rising vapors into what is known as "carbonic-oxid" or "carbon-monoxid" gas. The chamber between tubes G and H is therefore a combining-chamber for these gases, and the actual combustion of the gas does not occur until the gas issues from said chamber at its top and meets with the requisite oxygen or air. When this point is reached, the construction of the top of the burner becomes material to the end not only that combustion shall be complete, so as to avoid obnoxious and unhealthful odors, but to produce an even and concentrated flame and perfect combustion. Hence the peculiar construction of the disk P with a large imperforate central area over which the gases and such traces of vapor as may have escaped from the combining-chamber uncombined can flow and eddy and become combined under the favorable conditions there existing, the air entering through perforations *s* and the flame supported thereby serving to contribute to this result. This commingling and combining process is continued over and above the deflector O as the gases are evolved about the scalloped edge of the said deflector to the eddying-space immediately over the same. As this occurs, there is no combustion within the body of these moving, eddying, and combining gases, because there is no air to support combustion except the small flames over perforations *s*, but a blue flame plays over the said gases, which thus gather and commingle from all around the deflector O upon and above the same with the highest point of gases and flame at the center, the flame meantime enveloping and investing the body of said gases from about the top edge of the outer tube G over the edge of deflector O to a common center somewhat above the middle of said deflector. This eddying and mixing operation not only has the effect of evening combustion, so far as the gases from various points of the combining-chamber are concerned, but has the advantage of compensating for any inequalities in the character of the gas or gas and uncombined vapor that may reach the top of the burner. It is very difficult to so arrange the tubes G and H that the intervening space will be the same always all around. Hence more gas or gas and vapor will rise where there is most room, because at such points the combining process is liable to be defective. Therefore if the gas were consumed directly at the top of the combining-chamber by a supply of sufficient air both within and without the flame would be higher at some points than at others and a "ragged flame" would result with here and there tongues of yellow flame; but by having a common mixing space centrally over and above the disk P to which the gases and vapors will naturally flow by reason of the construction of the burner, substantially as shown, they are commingled and further combined and converted, so as to sustain an even and complete combustion across the top of the burner.

In the operation of a burner with a perforated air-retarding plate *t* in the lower portion of the inner perforated tube H and a perforated disk at the top of said tube a novel effect and advantage is obtained by reason of the association or combination of said tubes apart from their individual function. Thus, while the device *t* deflects the requisite air into the combining-chamber at a low plane to promote vaporization of oil, and the disk P provides a mixing and combining space at the top of the burner as well as providing for limited combustion above perforations *s*, the two devices act conjointly in this, that plate *t* checks the supply of air into the space above it and the disk P checks back the air passed by or through said device and thus promotes an even distribution of air to the perforations of the inner tube between said parts P and *t*, and avoids or prevents an excessive supply of air at any point through said inner tube.

As a great amount of heat passes downward from the burners, a warming-oven 2, Fig. 1, may be arranged in connection with the stove, in which case the said oven will be perforated, as shown at *u u u u*, or it may be open on the under side.

This improved stove is particularly adapted for the use of gasolene, although petroleum may be used therein.

What I claim, and desire to secure by Letters Patent, is—

1. In a vapor-stove, the burners composed of the two circular troughs F and I, one superimposed above the other, in combination with two perforated chimneys G and H, and the cap M, operating conjointly with the deflector O and T-nozzle J, arranged substantially in the manner as and for the purpose specified.

2. In a vapor-stove, in combination, a T-nozzle attached to the burner-supply tube, the cross-piece thereof curved to conform to the curvature of the trough I and provided with openings over said trough, arranged in the manner as and for the purpose described.

3. The combination, in a vapor-burner, of an inner and outer perforated chimney, a circular trough F, the inner chimney circumscribed by a circular trough I above the said trough F, and a T-nozzle with openings into said trough I, arranged substantially in the manner and for the purpose set forth.

4. In a vapor-burner, the combination of the two circular troughs F and I, and the T-nozzle J, with the lighting-tube L, opening into said trough F and provided with a stopper *p*, whereby the ignition of the gas or vapor in the troughs F and I is facilitated, substantially in the manner specified.

5. In combination with the inner and outer chimneys G and H, the described lower perforated plate *t* and the upper perforated disk P, arranged as specified, whereby the distribution of air within the interior chimney is checked and equalized, substantially as set forth.

6. In a vapor-burner, the scalloped deflector O, superimposed above the perforated chimneys G and H, and the cap M, in combination with said chimneys, the two circular troughs, and the nozzle J, arranged and operating substantially in the manner as and for the purpose set forth.

7. The combination, with a vapor-stove, of a valve-casing, a turning-valve operating therein and provided with a lever-handle *l*, a sleeve adjustable rotatably on said casing, and a stop pivoted to said sleeve and arranged when in its normal position to arrest the movement of said handle, but adapted to be moved out of the path of said handle when desired, substantially as described.

HENRY RUPPEL.

Witnesses:
H. E. WITHAM,
A. E. GILBERT.